(12) United States Patent
Takesue et al.

(10) Patent No.: US 7,037,963 B2
(45) Date of Patent: May 2, 2006

(54) GOLF BALL

(75) Inventors: Rinya Takesue, Chichibu (JP); Yasushi Ichikawa, Chichibu (JP); Hiroyuki Nagasawa, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 109 days.

(21) Appl. No.: 10/720,088

(22) Filed: Nov. 25, 2003

(65) Prior Publication Data

US 2004/0106736 A1 Jun. 3, 2004

(30) Foreign Application Priority Data

Nov. 29, 2002 (JP) .............................. 2002-347944

(51) Int. Cl.
*A63B 37/00* (2006.01)
*A63B 37/12* (2006.01)

(52) U.S. Cl. ..................... 524/322; 524/394; 524/400; 525/457; 525/458; 473/373; 473/374

(58) Field of Classification Search ................ 524/322, 524/394, 400; 525/457, 458; 473/373, 374
See application file for complete search history.

(56) References Cited

U.S. PATENT DOCUMENTS

| | | |
|---|---|---|
| 3,395,109 A | 7/1968 | Molitor et al. |
| 4,248,432 A | 2/1981 | Hewitt et al. |
| 4,442,282 A | 4/1984 | Kolycheck |
| 5,306,760 A | 4/1994 | Sullivan |
| 5,312,857 A | 5/1994 | Sullivan |
| 5,929,189 A | 7/1999 | Ichikawa et al. |
| 6,123,628 A | 9/2000 | Ichikawa et al. |
| 6,315,915 B1 * | 11/2001 | Hebert et al. .................. 216/67 |
| 6,582,325 B1 | 6/2003 | Ichikawa et al. |
| 2002/0099120 A1 * | 7/2002 | Takesue et al. .............. 524/394 |

FOREIGN PATENT DOCUMENTS

| | | |
|---|---|---|
| JP | 09-271538 | 10/1997 |
| JP | 11-178949 | 7/1999 |
| JP | 2002-336378 | * 11/2002 |
| WO | WO 98/46671 | 10/1998 |

* cited by examiner

*Primary Examiner*—David J. Buttner
(74) *Attorney, Agent, or Firm*—Sughrue Mion, PLLC

(57) ABSTRACT

A golf ball comprising a core and two or more outer layers covering said core, wherein the first outer layer is formed mainly from a mixture of a non-ionomer thermoplastic elastomer and an isocyanate compound and the second outer layer is formed mainly from a mixture composed of a resin component consisting of an ionomer resin and a non-ionomer thermoplastic elastomer, a fatty acid and/or a derivative thereof, a metal ion source capable of neutralizing unneutralized acid radicals in the above-mentioned components, and a compound having two or more reactive functional groups and a molecular weight no larger than 20,000, with the first outer layer being contiguous to the second outer layer, which exhibits superior in durability and rebound resilience.

11 Claims, No Drawings

GOLF BALL

BACKGROUND OF THE INVENTION

The present invention relates to a multi-piece golf ball which is composed of a core and outer layers contiguous to each other including at least one layer of non-ionomer thermoplastic elastomer and at least one layer of ionomer. The golf ball is characterized by good adhesion between the outer layer of non-ionomer thermoplastic elastomer and the outer layer of ionomer. It is also characterized by outstanding durability, rebound resilience, and productivity.

There has recently been proposed a new golf ball with an outer layer made of a soft non-ionomer thermoplastic elastomer typified by thermoplastic polyurethane elastomer. The golf ball with an outer layer of non-ionomer thermoplastic elastomer is superior in spin performance and shot feeling to conventional golf balls with an outer layer of ionomer. Thus the outer layer of non-ionomer thermoplastic elastomer is becoming predominant.

On the other hand, improvements are being made on the outer layer of ionomer for better rebound resilience, by replacing the conventional ionomer with a highly neutralized ionomer (which is obtained by incorporating an ionomer resin with a large amount of fatty acid and neutralizing ion source). The highly neutralized ionomer has a much better rebound resilience than the conventional ionomer. Thus the combination of an outer layer of polyurethane and an outer layer of highly neutralized ionomer has helped create a practical multi-piece golf ball having both ideal flying performance and spinning performance. These golf balls are disclosed in specification of U.S. Pat. Nos. 3,395,109, 4,248,432, 4,442,282, Japanese publication of (unexamined) patent application No. 9-271538 and No. 11-178949.

Unfortunately, an ionomer resin has a higher polarity than an ordinary non-ionomer thermoplastic elastomer and hence it is poor in adhesion to other resins than ionomer. Because of this poor adhesion, a multi-piece golf ball which has in combination an outer layer of ionomer and an outer layer of non-ionomer thermoplastic elastomer is liable to decrease in durability and rebound resilience.

One countermeasure against this trouble is to form a primer layer between the outer layer of ionomer and the outer layer of non-ionomer thermoplastic elastomer. However, it needs an additional step for primer coating, which leads to an increase in production cost.

SUMMARY OF THE INVENTION

The present invention was completed in view of the foregoing. It is an object of the present invention to provide a multi-piece golf ball with an outer layer of non-ionomer thermoplastic elastomer and an outer layer of ionomer, which is superior in durability, rebound resilience, and productivity owing to good adhesion between the two outer layers.

In order to achieve the above-mentioned object, the present inventors carried out a series of researches which led to the finding that it is possible to obtain a multi-piece golf ball having good durability and rebound resilience owing to good adhesion between the two outer layers with no primer between them, if the outer layer of non-ionomer thermoplastic elastomer is formed mainly from (a) a non-ionomer thermoplastic elastomer and (b) a mixture of (b-1) an isocyanate compound and (b-2) a thermoplastic resin which does not substantially react with isocyanate, and the outer layer of ionomer is formed mainly from a mixture composed of a resin component consisting of (in a ratio of from 100:0 to 50:50 by weight) (c) a base resin of one kind or more selected from (c-1) an olefin-unsaturated carboxylic acid binary random copolymer and a metal-ion neutralized product of an olefin-unsaturated carboxylic acid binary random copolymer and (c-2) an olefin-unsaturated carboxylic acid-unsaturated carboxylic ester ternary random copolymer and a metal-ion neutralized product of an olefin-unsaturated carboxylic acid-unsaturated carboxylic ester ternary random copolymer and (d) a non-ionomer thermoplastic elastomer, (e) a fatty acid and/or a derivative thereof having a carbon number of 18–80, (f) a metal ion source to neutralize unneutralized acid radicals in components (c) and (e) mentioned above, and (g) a compound having a molecular weight no larger than 20,000 and having two or more reactive functional groups. The present invention is based on this finding.

The present invention is directed to a golf ball as defined as follows.

The first aspect: A golf ball comprising a core and two or more outer layers covering said core, wherein: the first outer layer is formed mainly from (a) a non-ionomer thermoplastic elastomer and (b) a mixture of (b-1) an isocyanate compound and (b-2) a thermoplastic resin which does not substantially react with isocyanate; the second outer layer is formed mainly from a mixture composed of a resin component consisting of (in a ratio of from 100:0 to 50:50 by weight) (c) a base resin of one kind or more selected from (c-1) an olefin-unsaturated carboxylic acid binary random copolymer and a metal-ion neutralized product of an olefin-unsaturated carboxylic acid binary random copolymer and (c-2) an olefin-unsaturated carboxylic acid-unsaturated carboxylic ester ternary random copolymer and a metal-ion neutralized product of an olefin-unsaturated carboxylic acid-unsaturated carboxylic ester ternary random copolymer and (d) a non-ionomer thermoplastic elastomer, (e) a fatty acid and/or a derivative thereof having a carbon number of 18–80, (f) a metal ion source to neutralize unneutralized acid radicals in components (c) and (e) mentioned above, and (g) a compound having a molecular weight no larger than 20,000 and having two or more reactive functional groups, with the first outer layer being contiguous to the second outer layer.

The second aspect: The golf ball as defined in the first aspect, wherein the first outer layer is the outermost layer.

The third aspect: The golf ball as defined in the first or second aspect, wherein the non-ionomer thermoplastic elastomer as component (a) is a thermoplastic polyurethane elastomer.

The fourth aspect: The golf ball as defined in any of the first to third aspects, wherein component (b-1) is 4,4'-diphenylmethane diisocyanate and component (b-2) is a thermoplastic polyester elastomer.

The fifth aspect: The golf ball as defined in any of the first to fourth aspects, wherein the non-ionomer thermoplastic elastomer as component (d) is an olefinic thermoplastic elastomer.

The sixth aspect: The golf ball as defined in any of the first to fifth aspects, wherein the fatty acid as component (e) is behenic acid.

The seventh aspect: The golf ball as defined in any of the first to sixth aspects, wherein the amount of component (e) is 5–80 parts by weight for 100 parts by weight of the base resin [component (c) plus component (d)].

The eighth aspect: The golf ball as defined in any of the first to seventh aspects, wherein the metal ion source as component (f) is calcium hydroxide.

The ninth aspect: The golf ball as defined in any of the first to eighth aspects, wherein the amount of component (f) is 0.1–10 parts by weight for 100 parts by weight of the base resin [component (c) plus component (d)].

The tenth aspect: The golf ball as defined in any of the first to ninth aspects, wherein the compound as component (g) is a low-molecular-weight polyolefin polyol.

The eleventh aspect: The golf ball as defined in any of the first to tenth aspects, wherein the amount of component (8) is 0.1–100 parts by weight for 100 parts by weight of the base resin [component (c) plus component (d)].

DETAILED DESCRIPTION OF THE PREFERRED EMBODIMENTS

The invention will be described in more detail in the following.

The golf ball according to the present invention is a multi-piece one which is composed of a core and two or more outer layers covering the core. At least one of the outer layers (or the first outer layer) is of non-ionomer thermoplastic elastomer. It is formed mainly from (a) a non-ionomer thermoplastic elastomer and (b) a mixture of (b-1) an isocyanate compound and (b-2) a thermoplastic resin which does not substantially react with isocyanate.

(a) Non-ionomer Thermoplastic Elastomer

According to the present invention, the outer layer contains as its constituent a non-ionomer thermoplastic elastomer. This component is not specifically restricted; it includes olefin-based elastomers, styrene-based elastomers, polyester-based elastomers, and urethane-based elastomers. A thermoplastic polyurethane elastomer is particularly desirable.

The thermoplastic polyurethane material is composed of soft segments and hard segments, the former being polymeric polyol (or polymeric glycol) and the latter including chain extender and diisocyanate. The polymeric polyol (as one of the raw materials) is not specifically restricted; it may be selected from any conventional ones used in the technology relating to the thermoplastic polyurethane material. It may be either polyester-based one and polyether-based one; the latter is preferable to the former because it gives a thermoplastic polyurethane material having high rebound resilience and good low-temperature properties. Polyether polyol includes polytetramethylene glycol and polypropylene glycol. The former is desirable for rebound resilience and low-temperature properties. The polymeric polyol should preferably have an average molecular weight of 1000–5000, particularly 2000–4000 for production of a thermoplastic polyurethane material with high rebound resilience.

The chain extender may be any one which is conventionally used in the technology relating to thermoplastic polyurethane materials. It includes 1,4-butylene glycol, 1,2-ethylene glycol, 1,3-butanediol, 1,6-hexanediol, and 2,2-dimethyl-1,3-propanediol, which are merely exemplary. These chain extenders should preferably have an average molecular weight of 20–15000.

The diisocyanate may be any conventional one used in the technology relating to thermoplastic polyurethane materials. It includes aromatic diisocyanate (such as 4,4'-diphenylmethane diisocyanate, 2,4-toluene diisocyanate, and 2,6-tolene diisocyanate) and aliphatic diisocyanate (such as hexamethylene diisocyanate), which are merely exemplary. In the present invention, 4,4'-diphenylmethane diisocyanate (as an aromatic diisocyanate) is most desirable because of its stability in reaction with the isocyanate mixture (b) mentioned later. Some isocyanates present difficulties in controlling the crosslinking reaction that takes place during injection molding.

According to the present invention, the most desirable thermoplastic polyurethane material is the one which is synthesized from polyether polyol and aromatic diisocyanate. The former is polytetramethylene glycol having an average molecular weight no less than 2000, which is selected from the above-mentioned polyether polyols. The latter is 4,4'-diphenylemthane diisocyanate, which is selected from the above-mentioned aromatic diisocyanates.

The thermoplastic polyurethane material composed of the above-mentioned materials may be the one which is commercially available. Such commercial products include Pandex T-8290, T-8295, and T-8260 (from DIC Bayer Polymer Ltd.) and Rezamine 2593 and 2597 (from Dainichiseika Color & Chemicals Mfg. Co., Ltd.).

(b) Isocyanate Mixture

The isocyanate mixture is the one which is obtained from (b-1) an isocyanate compound having two or more functional groups in one molecule and (b-2) a thermoplastic resin dispersed therein which does not substantially react with isocyanate. The isocyanate compound as component (b-1) may be any conventional one used in the technology relating to thermoplastic polyurethane materials. It includes aromatic diisocyanates (such as 4,4'-diphenylmethane diisocyanate, 2,4-toluene diisocyanate, and 2,6-toluene diisocyanate) and aliphatic diisocyanate (such as hexamethylene diisocyanate), which are merely exemplary. Of these examples, 4,4'-diphenylmethane diisocyanate is most desirable because of its reactivity and safety in operation.

The thermoplastic resin as component (b-2) should preferably be the one which has low water absorption and high miscibility with thermoplastic polyurethane materials. It includes, for example, polystyrene resin, polyvinyl chloride resin, ABS resin, polycarbonate resin, and polyester elastomer (such as polyether-ester block copolymer and polyester-ester block copolymer). Of these examples, polyether-ester block copolymer is particularly preferable from the standpoint of rebound resilience and strength.

The isocyanate mixture as component (b) should be composed of the thermoplastic resin as component (b-2) and the isocyanate as component (b-1) in a ratio of from 100:5 to 100:100, particularly from 100:10 to 100:40, by weight. If the amount of the isocyanate compound as component (b-1) is excessively small relative to the amount of the thermoplastic resin as component (b-2), it would be necessary to use a large amount of component (b) for sufficient crosslinking reactions with the second outer layer. The result is that component (b-2) greatly affects to deteriorate physical properties. Conversely, component (b-1) in an excess amount makes it difficult to produce the mixture as component (b) because it causes slipping during mixing.

The isocyanate mixture as component (b) may be obtained by thoroughly mixing together the thermoplastic resin as component (b-2) and the isocyanate compound as component (b-1) at 130–250° C. by using a mixing roll or Banbury mixer. The resulting mixture is pelletized or crushed after cooling. The isocyanate mixture as component (b) may be selected from commercial products, such as Crosnate EM30 (from Dainichiseika Color & Chemicals Mfg. Co., Ltd.).

The First Outer Layer

The first outer layer is composed of the non-ionomer thermoplastic elastomer as component (a) and the isocyanate mixture as component (b). The non-ionomer thermoplastic elastomer as component (a) and the isocyanate mixture as component (b) should be compounded in a ratio of from 100:1 to 100:100, particularly from 100:5 to 100:50, by weight. A ratio from 100:100 to 100:30 is particularly desirable. If the isocyanate mixture as component (b) is used in an excessively small amount relative to the non-ionomer thermoplastic elastomer material as component (a), it will not achieve sufficient crosslinking reactions with the second outer layer. Conversely, if it is used in an excess amount, it leaves unreacted isocyanate to discolor the molded product.

The first outer layer may be incorporated with a variety of additives according to need, such as pigment, dispersing agent, antioxidant, light stabilizer, UV light absorber, and mold release agent.

According to the present invention, the outer layer is formed around a core by injection molding from a dry mix of the non-ionomer thermoplastic elastomer material as component (a) and the isocyanate mixture as component (b). The molding temperature varies depending on the kind of the non-ionomer thermoplastic elastomer material as component (a); it usually ranges from 150 to 250° C.

According to the present invention, the golf ball should meet the requirement that the first outer layer (formed by injection molding) have a surface hardness of 40–80, preferably 43–60, most desirably 45–55, measured with a durometer (D) in conformity with JIS K6253. If the outer layer has an excessively low hardness, the golf ball is subject to undue back spin at the time of iron shot, which implies poor controllability. Conversely, if the outer layer has an excessively high hardness, the golf ball hardly produces back spin at the time of iron shot, which implies poor controllability as well as modest hit feeling.

The second outer layer of ionomer is formed mainly from a mixture composed of a resin component consisting of (in a ratio of from 100:0 to 50:50 by weight) (c) a base resin of one kind or more selected from (c-1) an olefin-unsaturated carboxylic acid binary random copolymer and a metal-ion neutralized product of an olefin-unsaturated carboxylic acid binary random copolymer and (c-2) an olefin-unsaturated carboxylic acid-unsaturated carboxylic ester ternary random copolymer and a metal-ion neutralized product of an olefin-unsaturated carboxylic acid-unsaturated carboxylic ester ternary random copolymer and (d) a non-ionomer thermoplastic elastomer, (e) a fatty acid and/or a derivative thereof having a carbon number of 18–80, (f) a metal ion source to neutralize unneutralized acid radicals in components (c) and (e) mentioned above, and (g) a compound having a molecular weight no larger than 20,000 and having two or more reactive functional groups.

(c) Acid Copolymer and/or Metal Ion Neutralized Product of Acid Copolymer

The acid copolymer and/or metal ion neutralized product of acid copolymer is selected from (c-1) an olefin-unsaturated carboxylic acid binary random copolymer and/or a metal-ion neutralized product of an olefin-unsaturated carboxylic acid binary random copolymer and (c-2) an olefin-unsaturated carboxylic acid-unsaturated carboxylic ester ternary random copolymer and/or a metal-ion neutralized product of an olefin-unsaturated carboxylic acid-unsaturated carboxylic ester ternary random copolymer.

The above-mentioned base resin as component (c-1) or (c-2) should contain an olefin having a carbon number no less than 2, no larger than 8, particularly no larger than 6. Examples of the olefin include ethylene, propylene, butene, pentene, hexene, heptene, and octene. Of these examples, ethylene is particularly desirable.

Examples of the unsaturated carboxylic acid include acrylic acid, methacrylic acid, maleic acid, and fumaric acid. Of these examples, acrylic acid and methacrylic acid are preferable.

The unsaturated carboxylic ester should preferably be a lower alkyl ester of the above-mentioned unsaturated carboxylic acid. It includes, for example, methyl methacrylate, ethyl methacrylate, propyl methacrylate, butyl methacrylate, methyl acrylate, ethyl acrylate, propyl acrylate, and butyl acrylate. Of these examples, n-butyl or i-butyl acrylate is preferable.

The olefin-unsaturated carboxylic acid binary random copolymer as component (c-1) and the olefin-unsaturated carboxylic acid-unsaturated carboxylic ester ternary random copolymer as component (c-2) are collectively referred to as the random copolymer hereinafter. According to the present invention, the random copolymer is obtained from the above-mentioned materials by any known method for random copolymerization.

According to the present invention, the random copolymer should contain the unsaturated carboxylic acid in a controlled amount. The content of the unsaturated carboxylic acid in the random copolymer as component (c-1) should usually be no less than 4 wt % and no more than 30 wt %. The lower limit may be increased to 6 wt %, 8 wt %, or 10 wt %, and the upper limit may be decreased to 20 wt %, 18 wt %, or 15 wt %.

Likewise, the content of the unsaturated carboxylic acid in the random copolymer as component (c-2) should usually be no less than 4 wt % and no more than 15 wt %. The lower limit may be increased to 6 wt % or 8 wt %, and the upper limit may be decreased to 12 wt % or 10 wt %. An excessively low acid content leads to low rebound resilience and an excessively high acid content leads to poor processability.

The metal ion neutralized product of the olefin-unsaturated carboxylic acid binary random copolymer as component (c-1) and the metal ion neutralized product of the olefin-unsaturated carboxylic acid-unsaturated carboxylic ester ternary random copolymer as component (c-2) are collectively referred to as the metal ion neutralized product of the random copolymer hereinafter. They are obtained by partially neutralizing the acid radicals in the random copolymer with metal ions.

The metal ions to neutralize the acid radicals include, for example, $Na^+$, $K^+$, $Li^+$, $Zn^{++}$, $Cu^{++}$, $Mg^{++}$, $Ca^{++}$, $Co^{++}$, $Ni^{++}$, and $Pb^{++}$. Of these examples, $Na^+$, $Li^+$, $Zn^{++}$, $Mg^{++}$, and $Ca^{++}$ are preferable.

According to the present invention, the metal ion neutralized product of the random copolymer is obtained by neutralizing the above-mentioned random copolymer with the above-mentioned metal ion. The above-mentioned metal ion may be used in the form of formate, acetate, nitrate, carbonate, hydrogen carbonate, oxide, hydroxide, or alkoxide. No restrictions are imposed on the extent to which the random copolymer is neutralized with the metal ion.

According to the present invention, the base resins of component (c-1) and component (c-2) may be commercial ones. For example, the random copolymer of component (c-1) may be any of Nucrel 1560, 1214, and 1035 (from Mitsui-DuPont Polychemical) or any of Escor 5200, 5100, and 5000 (from Exxon Mobile Chemical). The random copolymer of component (c-2) may be any of Nucrel AN4311 and AN4318 (from Mitsui-DuPont Polychemical) or any of Escor ATX325, ATX320, and ATX310 (from Exxon Mobile Chemical).

In addition, the metal ion neutralized product of random copolymer as component (c-1) may be any of Himilan 1554, 1557, 1601, 1605, 1706, and AM7311 (from Du pont-Mitsui Polychemicals Co., ltd.), or Surlyn 7930 (from DuPont in the US), or any of Iotec 3110 and 4200 (from ExxonMobil Chemical Company). The metal ion neutralized product of random copolymer as component (c-2) may be any of Himilan 1855, 1856, and AM7316 (from Du pont-Mitsui Polychemicals Co., ltd.), or any of Surlyn 6320, 8320, 9320, and 8120 (from DuPont in the US), or any of Iotec 7510 and 7520 (from ExxonMobil Chemical Company). Of these examples, Himilan 1706, 1557, and AM7316 are desirable as zinc-neutralized ionomer resins.

The base resin in the present invention may be prepared from components (c-1) and (c-2) individually or by blending. In the case of blending, the ratio (by weight) of component (c-1) to component (c-2) should be from 90:10 to 10:90, preferably from 80:20 to 20:80, more preferably from 70:30 to 30:70, and most desirably from 60:40 to 40:60. If the amount of component (c-1) is excessively small or large, the resulting golf ball is poor in rebound resilience or poor in hit feeling, respectively.

The base resins of components (c-1) and (c-2) may be improved in moldability if the mixing ratio is properly controlled for the random copolymer and the metal ion neutralized product of the random copolymer. The random copolymer and the metal ion neutralized product of the random copolymer may be used individually or may be used in the blended form. The blending ratio (by weight) is usually from 10:90 to 90:10, preferably from 20:80 to 80:20, more preferably from 30:70 to 70:30, and most desirably from 40:60 to 60:40. The random copolymer in an excessively large amount would adversely affect the mixing performance.

(d) Non-ionomer Thermoplastic Elastomer

According to the present invention, component (d) is an optional component to improve hit feeling and rebound resilience. In the present invention, component (c) and component (d) are collectively referred to as resin component. Component (d) is a non-ionomer thermoplastic elastomer excluding ionomer resins. It includes, for example, olefin-based elastomer, styrene-based elastomer, polyester-based elastomer, urethane-based elastomer, and polyamide-based elastomer. Of these examples, olefin-based elastomer (particularly the one which has crystalline olefin blocks) is preferable for better rebound resilience.

Component (d) may be commercial ones, such as Dynalon (from JSR Corporation) as the olefin-based elastomer and Hytrel (from Du Pont-Toray Co., Ltd.) as the polyester-based elastomer.

According to the present invention, component (d) is an optional one which may not be added. In the case where component (d) is added, the ratio (by weight) of component (c) to component (d) should be from 95:5 to 50:50, preferably from 90:10 to 60:40, and more preferably from 85:15 to 65:35. Component (d) in an excessively small amount will not produce the effect of improving hit feeling, and component (d) in an excessively large amount will give a golf ball with poor durability on account of reduced miscibility.

(e) Fatty Acid or Derivative Thereof

According to the present invention, component (e) is a fatty acid having a molecular weight no less than 280 and no more than 1500, or a derivative thereof. It has a much smaller molecular weight than the above-mentioned base resin; it properly adjusts the melt viscosity of the mixture and contributes to fluidity. Component (e) in the present invention contains a comparatively large amount of acid radicals (derivatives) and prevents the excessive loss of rebound resilience.

According to the present invention, the fatty acid or derivative thereof as component (e) should have a molecular weight no less than 280, preferably no less than 300, more preferably no less than 330, and most desirably no less than 360. The upper limit should be no more than 1500, preferably no more than 1000, more preferably no more than 600, and most desirably no more than 500. The one with an excessively small molecular weight does not improve heat resistance; the one with an excessively large molecular weight does not improve fluidity.

According to the present invention, the fatty acid or derivative thereof as component (e) may also include an unsaturated fatty acid (or a derivative thereof) having a double bond or triple bond in the alkyl group, or a saturated fatty acid (or a derivative thereof) having a single bond in the alkyl group. All of the saturated and unsaturated fatty acids should have a carbon number (in one molecule) of usually no less than 18, preferably no less than 20, more preferably no less than 22, and most desirably no less than 24. The upper limit should be no more than 80, preferably no more than 60, more preferably no more than 40, and most desirably no more than 30. Those which have an excessively small carbon number do not improve heat resistance and fluidity (on account of mutual actions between excessive acid radicals contained in the base resin). Conversely, those which have an excessively large carbon number do not improve fluidity (on account of the large molecular weight).

Examples of the fatty acid as component (e) include stearic acid, 12-hydroxystearic acid, behenic acid, oleic acid, linoleic acid, linolenic acid, arachidic acid, lignoceric acid. Of these examples, stearic acid, arachidic acid, behenic acid, and linolenic acid are preferable, and behenic acid is far preferable.

The fatty acid derivative as component (e) includes those soaps in which protons contained in the acid radical of the fatty acid are replaced by metal ions. In this case, the metal ions include, for example, $Na^+$, $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$, and $Co^{++}$. Of these examples, $Ca^{++}$, $Mg^{++}$, and $Zn^{++}$ are preferable.

Examples of the fatty acid derivative as component (e) include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate, and zinc lignocerate. Of these examples, magnesium stearate, calcium stearate, zinc stearate, magnesium arachidate, calcium arachidate, zinc arachidate, magnesium behenate, calcium behenate, zinc behenate, magnesium lignocerate, calcium lignocerate, and zinc lignocerate are preferable.

The combination of the base resin consisting of components (c) and (d) and component (e) may be any known metal soap-modified ionomer, such as those disclosed in U.S. Pat. Nos. 5,312,857 and 5,306,760 and international publication No. 98/46671.

(f) Metal Ion Source to Neutralize Unneutralized Acid Radicals in Components (c) and (e)

According to the present invention, component (f) is a basic inorganic metal compound capable of neutralizing acid radicals in the above-mentioned base resin and component (e). It is an indispensable component in the present invention. Without component (f), the metal soap-modified ionomer resin (the one disclosed in the above-mentioned publications) used alone causes exchange reactions to take place between the metal soap and unneutralized acid radicals contained in the ionomer resin. The exchange reactions give off a large amount of fatty acid, which, owing to its poor thermal stability and its easy evaporation at the time of molding, results in poor molding and adheres to the surface of the molding, thereby greatly deteriorating the adhesion of coating film.

According to the present invention, this problem is addressed by incorporation with component (f) which contains as an essential ingredient a basic inorganic metal compound to neutralize the acid radicals contained in components (c) and (e). Component (f) also makes the molded product to have good rebound resilience.

In other words, according to the present invention, component (f) as an essential ingredient is incorporated into the molding material so that it neutralizes the acid radicals contained in components (c) and (e). It also improves the thermal stability of the mixture and imparts good moldability and rebound resilience.

The basic inorganic metal compound as component (f) should preferably be one which is highly reactive to the base resin. In addition, it should preferably be one which increases the degree of neutralization of the mixture without deteriorating its thermal stability because it gives a by-product containing no organic acid.

The metal ion in the basic inorganic metal compound of component (f) includes, for example, $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$, and $Co^{++}$. The basic inorganic metal compound may be any basic inorganic filler containing these metal ions. Preferred examples include magnesium oxide, magnesium hydroxide, magnesium carbonate, zinc oxide, sodium hydroxide, sodium carbonate, calcium oxide, calcium hydroxide, lithium hydroxide, and lithium carbonate. Of these examples, hydroxide and monoxide are desirable. Calcium hydroxide and magnesium oxide, which are highly reactive to the base resin, are more desirable, and calcium hydroxide is recommended.

According to the present invention, the material from which the second outer layer is formed is prepared from the resin component consisting of component (c) and component (d) [which is optional] and a prescribed amount of component (e) and component (f). This material imparts good thermal stability, good fluidity, good moldability, and highly improved rebound resilience to the molded product.

According to the present invention, each amount of components (e) and (f) is determined based on 100 parts by weight of the resin component consisting of components (c) and (d). The amount of component (e) should be no less than 5 pbw, preferably no less than 10 pbw, more preferably no less than 15 pbw, and most desirably no less than 18 pbw. The upper limit is no more than 80 pbw, preferably no more than 25 pbw, more preferably no more than 22 pbw, and most desirably no more than 20 pbw. The amount of component (f) should be no less than 0.1 pbw, preferably no less than 0.5 pbw, more preferably no less than 1 pbw, and most desirably no less than 2 pbw. The upper limit is no more than 10 pbw, preferably no more than 8 pbw, more preferably no more than 6 pbw, and most desirably no more than 5 pbw. Component (e) will lower the melt viscosity and adversely affect processability if used in an excessively small amount or will deteriorate thermal stability if used in an excessively large amount. Component (f) will not improve thermal stability and rebound resilience if used in an excessively small amount and will deteriorate the thermal stability of the molding material for the golf ball on account of the excessive basic inorganic metal compound if used in an excessively large amount.

According to the present invention, the material from which the second outer layer is formed is prepared from the above-mentioned resin component, component (c), and component (d) in prescribed amounts. It is recommended that the material has its acid radials neutralized up to no less than 50 mol %, preferably no less than 60 mol %, more preferably no less than 70 mol %, and most desirably no less than 80 mol %. The high degree of neutralization certainly suppresses the undesirable exchange reaction that occurs when only the base resin and fatty acid (or derivative thereof) are used in the conventional technology. In this way it is possible to prevent the occurrence of fatty acid, to greatly improve thermal stability, to achieve good moldability, and to obtain a molded product which is by far superior in rebound resilience to that molded from the conventional ionomer resin.

The degree of neutralization is applicable to the acid radicals contained in the mixture of the base resin and the fatty acid (or derivative thereof) of component (e). Therefore, it is different from the degree of neutralization applicable to the ionomer resin itself in the case where the ionomer resin is the metal ion neutralized product of the random copolymer in the base resin. If the degree of neutralization is the same for the mixture in the present invention and the ionomer resin, the former has more ion crosslinks, which contribute to rebound resilience, owing to its very high content of metal ions.

(g) Compound having Two or More Functional Groups and a Molecular Weight No Larger than 20,000

The last component (g) used in the present invention is a compound having two or more functional groups and a molecular weight no larger than 20,000. This compound is a monomer, oligomer, or macromonomer having one or more reactive functional groups (of one kind or more) in one molecule and a molecular weight no larger than 20,000, preferably no larger than 5000. The number of functional groups has no specific upper limit; it is usually no more than 6.

Monomer is a chemical compound in a simple form which is not yet polymerized. Oligomer is a low-molecular-weight compound obtained from a monomer for polymerization; it includes compounds consisting of two or more monomers and it also includes those compounds having a molecular weight of several thousands. Macromonomer denotes an oligomer which has polymerizable functional groups at the terminals of the molecule; it is used to synthesize a graft polymer by copolymerization with a functional comonomer. Its molecular weight ranges from thousands to tens of thousands. It is commonly used as an intermediate material for synthesis of plastics and elastomers. Recently, oligomers and macromonomers having varied functions are attracting attentions.

The reactive functional group is not specifically restricted so long as it is able to improve adhesion between members. It should preferably be a hydroxyl group, amino group, carboxyl group, or epoxy group. A hydroxyl group is desirable because it hardly affects the melt flow rate (MFR) in the case of blending with an ionomer resin.

The monomer includes 1,3-butanediol, 1,6-hexanediol, trimethylolpropane, mannitol, sorbitol, and polysaccharide. The oligomer or macromonomer includes polyethylene glycol, polyhydroxypolyolefin oligomer, modified low-molecular-weight polyethylene, modified low-molecular-weight polypropylene, modified low-molecular-weight polystyrene, and modified liquid rubber, which are merely exemplary. Of these examples, polyhydroxypolyolefin and trimethylolpropane are desirable. They may be used alone or in combination with one another.

The above-mentioned monomer, oligomer, or macromonomer may be a commercial one, such as trimethylolpropane (from MITSUBISHI GAS CHEMICAL COMPANY, INC.) and polyhydroxypolyolefin oligomer ("Polytale H" from MITSUBISHI CHEMICAL CORPORATION) which has main chains with a carbon number of 150–200 and hydroxyl groups at terminals.

The above-mentioned compound having two or more reactive functional groups should be used in an amount (based on 100 pbw of resin component) of 0.1–100 pbw, preferably 0.2–50 pbw, more preferably 0.3–20 pbw, far preferably 0.4–10 pbw, and most desirably 0.5–5 pbw. With an excessively small amount, it does not fully produce its effect; with an excessively large amount, it adversely affects the physical properties of the golf ball.

The material from which the second outer layer is formed is prepared by mixing the above-mentioned essential components and optional components. Mixing may be accomplished at 150–250° C. by using a twin-screw extruder or an internal mixer (such as Banbury mixer and kneader). The mixing method is not specifically restricted. It is possible to mix with heating all the components at one time or to mix with heating the essential components and then add the optional components.

According to the present invention, good adhesion is achieved between the first outer layer and the second outer layer. This good adhesion may be attributable to the reaction between the isocyanate group in component (b) constituting the first outer layer and the functional group (such as hydroxyl group, amino group, carboxyl group, and epoxy group) in component (g) constituting the second outer layer. At the time of injection molding, this reaction forms urethane linkages, urea linkages, amide linkages, and oxazolidone linkages, which contribute to highly improved adhesion.

The material from which the second outer layer is formed should preferably have an adequately controlled melt flow rate that ensures good fluidity for injection molding. The melt flow rate should be measured at 190° C. under a load of 21.18 N (2.16 kg) according to JIS K7210. The value of melt flow rate should be no less than 0.5 dg/min, preferably no less than 1 dg/min, more preferably no less than 1.5 dg/min, and most desirably no less than 2 dg/min. The upper limit should be no more than 20 dg/min, preferably no more than 10 dg/min, more preferably no more than 5 dg/min, and most desirably no more than 3 dg/min. With an excessively large or small melt flow rate, the material would be very poor in processability.

In addition, the material should have a specific gravity of 0.9–1.2, preferably 0.92–1.1, and more preferably 0.93–1.05.

Either of the first outer layer and the second outer layer may be placed outside or inside; however, it is necessary that they are contiguous to each other. However, it is desirable that the first outer layer constitutes the outermost layer so that the maximum adhesion is obtained between the two layers.

The first outer layer should have a Durometer D hardness no less than 40 and no more than 80, preferably no less than 43 and no more than 60, and more preferably no less than 45 and no more than 55. The second outer layer should have a Durometer D hardness no less than 40 and no more than 70, preferably no less than 45 and no more than 65, and more preferably no less than 50 and no more than 60. Either of the first outer layer and the second outer layer may be harder than the other; however, usually, the second outer layer is harder than the first outer layer.

The first and second outer layers are not specifically restricted in thickness. Their thickness should be no less than 0.5 mm, preferably no less than 0.9 mm, and more preferably no less than 1.1 mm. The upper limit should be no less than 3 mm, preferably no less than 2.5 mm, and more preferably no less than 2.0 mm. The total thickness of the two layers should be no less than 1.0 mm, preferably no less than 1.8 mm, and no more than 6.0 mm, preferably no more than 5.0 mm.

The golf ball according to the present invention may have a thread wound core or a solid core on which the outer layers are formed. It may be produced in the usual way.

The solid core may be formed from the following rubber composition by pressing (for vulcanization or crosslinking) and compression into a spherical shape at 140–170° C. for 10–40 minutes. 100 pbw of cis-1,4-polybutadiene; 10–60 pbw of one or more vulcanizing agents selected from α,β-monoethylene unsaturated carboxylic acid (such as acrylic acid and methacrylic acid) or metal ion neutralized product thereof, and functional monomer (such as trimethylolpropane methacrylate); 5–30 pbw of filler (such as zinc oxide and barium sulfate); 0.5–5 pbw of peroxide (such as dicumyl peroxide); and 0.1–1 pbw of age resistor (optional).

The thread-wound core can be produced by winding thread under tension around a liquid center or solid center. The liquid center can be produced in the usual way by filling a hollow spherical center bag of rubber with a liquid. The solid center can be produced by the same way as used for the solid core. The rubber thread is the one which is ordinarily used. It is prepared from a rubber composition consisting of natural rubber or synthetic rubber (such as polyisoprene), antioxidant, vulcanization accelerator, sulfur, and other additives.

The golf ball of the present invention is obtained by forming on the above-mentioned core the outer layers from the materials specified in the present invention. The outer layers may be formed by injection-molding the material (which has previously been heated, mixed, and melted) into a mold holding therein a single-layer core or a multi-layer core, depending on the type of the golf ball desired. Production of the golf ball can be carried out under the condition which secures good thermal stability, fluidity, and moldability. The resulting golf ball has high rebound resilience.

The method of forming the outer layers is not limited to that mentioned above. Another possible method consists of forming a pair of semispherical half cups from the material specified in the present invention, enclosing the above-mentioned core in these half cups, and pressing them at 120–170° C. for 1–5 minutes.

The golf ball according to the present invention has a large number of dimples formed on the surface thereof. In addition, the outer layer may undergo various treatments such as priming, stamping, and painting. The outer layer formed from the material specified in the present invention readily permits surface treatment. The outermost layer facilitates painting and other operation.

The golf ball formed as mentioned above may vary in the diameter, weight, and hardness of the solid or liquid center, and solid core or thread-wound core. They may be properly adjusted to achieve the object of the present invention.

The golf ball according to the present invention may have a diameter no less than 42.67 mm and a weight no more than 45.93 g, in accordance with the Rules of Golf.

EXAMPLE

The invention will be described in more detail with reference to the following examples and comparative examples, which are not intended to restrict the scope thereof.

Examples and Comparative Examples

A solid core was formed from a material composed mainly of cis-1,4-polybutadiene. It has a diameter of 36.4 mm, a weight of 29.4 g, and a deformation of 3.7 mm under a load of 980 N (100 kg).

A material for the intermediate layer (the second outer layer) was prepared according to the composition shown in Table 2. The components were mixed at 230° C. by using a twin-screw extruder and then the resulting mix was pelletized. The pellets were injection-molded into a mold having a solid core placed therein, so that an intermediate layer (1.7 mm thick) was formed. In Comparative Examples 2 and 5, the intermediate layer was treated with a primer.

Further, the outermost layer (the first outer layer) was formed by injection molding from the composition shown in Table 1. Thus, there was obtained a three-piece golf ball having a diameter of 42.8 mm and a weight of 45.2 g. The non-ionomer thermoplastic elastomer used in the example was Pandex T8295. The isocyanate mixture used in this example was Crosnate EM30 (from Dainichiseika Color & Chemicals Mfg. Co., Ltd.), which is an isocyanate master batch of polyester elastomer containing 30 wt % of 4,4'-diphenylmethane diisocyanate. In Comparative Example 3, Pandex T8295 was injection-molded on the intermediate layer. In other Examples and Comparative Examples, the outer layer was formed on the intermediate layer from a dry mix (100:18 by weight) of Pandex 8295 and Isocyanate. This dry mix was prepared just before injection molding.

The thus obtained golf balls were tested for the following items. The results are shown in Table 1.

Ball Hardness

Expressed in terms of amount of ball deformation (mm) under a load of 980 N (100 kg).

Initial Velocity

Measured by using the same initial velocity meter as used by the golf ball official organization R&A (USGA) according to the rule of R&A (USGA).

Impact Durability

Expressed in terms of the number of consecutive hits (with an impact equivalent to that of the driver (W#1) HS=50 m/s) for the ball to decrease in rebound resilience by 3%. Hitting was repeated 100 times for each sample.

Comparative Examples 1 and 4 demonstrate the effect of not treating the second outer layer. The resulting golf ball was poor in rebound resilience and impact durability on account of poor adhesion between the first outer layer (of polyurethane elastomer) and the second outer layer (of ionomer resin).

Comparative Examples 2 and 5 demonstrate the effect of treating the second outer layer with a primer. The resulting golf ball is better in adhesion and durability than that without treatment on the second outer layer. However, the effect is not satisfactory.

Comparative Example 3 demonstrates the effect which is produced when the second outer layer was incorporated with component (g) [which is a compound having two or more reactive functional groups and a molecular weight no more than 20,000] and the first outer layer was not incorporated with the isocyanate mixture. It showed some improvements in adhesion and durability, but the effect was not satisfactory. By contrast, Examples 1 to 4 were by far superior in rebound resilience and impact durability to Comparative Examples.

TABLE 1

| | | | Example | | | | Comparative Example | | | | |
|---|---|---|---|---|---|---|---|---|---|---|---|
| | | | 1 | 2 | 3 | 4 | 1 | 2 | 3 | 4 | 5 |
| First outer layer | | | | | | | | | | | |
| Composition (pbw) | Component (a) | Pandex T8295 | 100.0 | 100.0 | 100.0 | 100.0 | 100.0 | 100.0 | 100.0 | 100.0 | 100.0 |
| | Component (b) | Crosnate EM30 | 18.0 | 18.0 | 18.0 | 18.0 | 18.0 | 18.0 | | 18.0 | 18.0 |
| Physical properties | Surface hardness (Durometer D) | | 50 | 50 | 50 | 50 | 50 | 50 | 50 | 50 | 50 |
| | Specific gravity | | 1.19 | 1.19 | 1.19 | 1.19 | 1.19 | 1.19 | 1.19 | 1.19 | 1.19 |
| Second outer layer | | | | | | | | | | | |
| Composition (pbw) | Component (c) | Himilan 1605 | 68.0 | 68.0 | | | 65.0 | 65.0 | 68.0 | | |
| | | Himilan 1601 | | | 73.0 | 73.0 | | | | 70.0 | 70.0 |
| | Component (d) | Dynalon 6100P | 32.0 | 32.0 | 27.0 | 27.0 | 35.0 | 35.0 | 32.0 | 30.0 | 30.0 |
| | Component (e) | Behenic acid | 18.0 | 20.0 | 18.0 | 20.0 | 20.0 | 20.0 | 18.0 | 20.0 | 20.0 |
| | Component (f) | Calcium hydroxide | 2.4 | 2.4 | 2.2 | 2.2 | 2.4 | 2.4 | 2.4 | 2.2 | 2.2 |

TABLE 1-continued

|  |  |  | Example | | | | Comparative Example | | | | |
|---|---|---|---|---|---|---|---|---|---|---|---|
|  |  |  | 1 | 2 | 3 | 4 | 1 | 2 | 3 | 4 | 5 |
| Component (g) | Polytale H | | 2.0 | | 2.0 | | | 2.0 | | | |
|  | TMP | | | 2.0 | | | | | | | |
|  | Mannitol | | | | | 2.0 | | | | | |
| Treated with primer | | | | | | | | yes | | | yes |
| Physical properties | Melt flow rate (dg/min) | | 2.0 | 2.0 | 2.0 | 2.0 | 2.0 | 2.0 | 2.0 | 2.0 | 2.0 |
|  | Outer layer hardness (Durometer D) | | 56 | 56 | 53 | 53 | 56 | 56 | 56 | 53 | 53 |
| Properties of ball | | | | | | | | | | | |
| Weight (g) | | | 45.2 | 45.2 | 45.2 | 45.2 | 45.2 | 45.2 | 45.2 | 45.2 | 45.2 |
| Hardness (mm) | | | 2.76 | 2.76 | 2.80 | 2.80 | 2.76 | 2.76 | 2.76 | 2.80 | 2.80 |
| Initial velocity (m/s) | | | 77.3 | 77.3 | 77.2 | 77.2 | 77.0 | 77.1 | 77.2 | 76.9 | 77.1 |
| Impact durability | | | No crack | No crack | No crack | No crack | 40 | 60 | 70 | 40 | 60 |

Pantex T8295: thermoplastic polyurethane elastomer (from DIC Bayer Polymer Ltd.)
Crosnate EM30: isocyanate master batch (from Dainichiseika Color & Chemicals Mfg. Co., Ltd.)
Himilan 1605: sodium ionomer (from Du pont-Mitsui Polychemicals Co., ltd.)
Himilan 1601: sodium ionomer (from Du pont-Mitsui Polychemicals Co., ltd.)
Dynalon 6100P: olefin-based thermoplastic elastomer (from JSR Corporation)
Polytale H: low-molecular-weight polyolefin polyol (from MITSUBISHI CHEMICAL CORPORATION)
TMP: trimethylolpropane (from MITSUBISHI GAS CHEMICAL COMPANY, INC)

The multi-piece golf ball according to the present invention has an outer layer of non-ionomer thermoplastic elastomer and an outer layer of ionomer. It is superior in durability and rebound resilience because the two outer layers firmly adhere to each other. It is also superior in productivity.

Japanese Patent Application No. 2002-347944 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core and two or more layers covering said core, wherein:
    the first layer is formed mainly from (a) a non-ionomer thermoplastic elastomer and (b) a mixture of (b-1) an isocyanate compound and (b-2) a thermoplastic resin which does not substantially react with isocyanate; and
    the second layer is formed mainly from a mixture composed of a resin component consisting of (in a ratio of from 100:0 to 50:50 by weight) (c) a base resin of one kind or more selected from (c-1) an olefin-unsaturated carboxylic acid binary random copolymer and a metal-ion neutralized product of an olefin-unsaturated carboxylic acid binary random copolymer and (c-2) an olefin-unsaturated carboxylic acid-unsaturated carboxylic ester ternary random copolymer and a metal-ion neutralized product of an olefin-unsaturated carboxylic acid-unsaturated carboxylic ester ternary random copolymer and (d) a non-ionomer thermoplastic elastomer, (e) a fatty acid and/or a derivative thereof having a carbon number of 18–80, (f) a metal ion source to neutralize unneutralized acid radicals in components (c) and (e) mentioned above, and (g) a compound having a molecular weight no larger than 20,000 and having two or more reactive functional groups,
    with the first layer being contiguous to the second layer.

2. The golf ball of claim 1, wherein the first layer is the outermost layer.

3. The golf ball of claim 1, wherein the non-ionomer thermoplastic elastomer as component (a) is a thermoplastic polyurethane elastomer.

4. The golf ball of claim 1, wherein component (b-1) is 4,4'-diphenylmethanediisocyanate and component (b-2) is a thermoplastic polyester elastomer.

5. The golf ball of claim 1, wherein the non-ionomer thermoplastic elastomer as component (d) is an olefinic thermoplastic elastomer.

6. The golf ball of claim 1, wherein the fatty acid as component (e) is behenic acid.

7. The golf ball of claim 1, wherein the amount of component (e) is 5–80 parts by weight for 100 parts by weight of the base resin [component (c) plus component (d)].

8. The golf ball of claim 1, wherein the metal ion source as component (f) is calcium hydroxide.

9. The golf ball of claim 1, wherein the amount of component (f) is 0.1–10 parts by weight for 100 parts by weight of the base resin [component (c) plus component (d)].

10. The golf ball of claim 1, wherein the compound as component (g) is a low-molecular-weight polyolefin polyol.

11. The golf ball of claim 1, wherein the amount of component (g) is 0.1–100 parts by weight for 100 parts by weight of the base resin [component (c) plus component (d)].

* * * * *